United States Patent
Agawa

(10) Patent No.: US 9,727,713 B2
(45) Date of Patent: Aug. 8, 2017

(54) SERVER APPARATUS, LOGIN MANAGEMENT SYSTEM, AND NON-TRANSITORY STORAGE MEDIUM HAVING COMPATIBILITY BETWEEN AUTOMATIC LOGOUT FUNCTION AND AUTOMATIC REFRESHING FUNCTION

(71) Applicant: KYOCERA DOCUMENT SOLUTIONS INC., Osaka-shi (JP)

(72) Inventor: Ryohei Agawa, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 120 days.

(21) Appl. No.: 14/384,375

(22) PCT Filed: Feb. 20, 2013

(86) PCT No.: PCT/JP2013/054233
§ 371 (c)(1),
(2) Date: Sep. 10, 2014

(87) PCT Pub. No.: WO2013/136934
PCT Pub. Date: Sep. 19, 2013

(65) Prior Publication Data
US 2015/0067779 A1    Mar. 5, 2015

(30) Foreign Application Priority Data
Mar. 12, 2012    (JP) ................................. 2012-054333

(51) Int. Cl.
G06F 21/31    (2013.01)
H04L 29/06    (2006.01)
H04L 29/08    (2006.01)

(52) U.S. Cl.
CPC .............. *G06F 21/31* (2013.01); *H04L 63/08* (2013.01); *H04L 67/143* (2013.01); *H04L 67/145* (2013.01); *G06F 2221/2137* (2013.01)

(58) Field of Classification Search
CPC ....... G06F 21/31; H04L 63/08; H04L 67/143; H04L 67/145
See application file for complete search history.

(56) References Cited

U.S. PATENT DOCUMENTS

2003/0088677 A1*  5/2003  Yamamoto .............. H04L 67/36
                                                        709/227
2012/0209904 A1*  8/2012  Huang .................... H04L 67/14
                                                        709/203

FOREIGN PATENT DOCUMENTS

CN    102143226 A    8/2011
EP    2627057 A1    8/2013
(Continued)

OTHER PUBLICATIONS

Extended European Search Report issued Sep. 24, 2015 in corresponding EP Application No. 13761440.0.

*Primary Examiner* — Brandon Hoffman
*Assistant Examiner* — Wasika Nipa
(74) *Attorney, Agent, or Firm* — Knobbe Martens Olson & Bear LLP

(57) ABSTRACT

The present invention is provided with the page responding unit 33, the login performing unit 31, the logout performing unit 35, the counting unit 37, and the logout managing unit 39. The page responding unit 33 submits a response of a Web page in response to an automatic request or a manual request from a user. The login performing unit 31 performs login by user authentication. The logout performing unit 35 performs logout of the user in a case in which the request from the user who logged in is not received within the login timeout period. The counting unit 37 counts the automatic request (Continued)

upon reception of the automatic request within the login timeout period. The logout managing unit 39 makes the logout performing unit 35 perform logout in a case in which the accumulated refreshing time exceeds the login timeout period.

3 Claims, 4 Drawing Sheets

(56) References Cited

FOREIGN PATENT DOCUMENTS

| | | |
|---|---|---|
| JP | 2003-141074 A | 5/2003 |
| JP | 2005-353025 A | 12/2005 |
| JP | 2008-141489 A | 6/2008 |
| JP | 2008-158808 A | 7/2008 |
| JP | 2010-198055 A | 9/2010 |

* cited by examiner

SERVER APPARATUS, LOGIN MANAGEMENT SYSTEM, AND NON-TRANSITORY STORAGE MEDIUM HAVING COMPATIBILITY BETWEEN AUTOMATIC LOGOUT FUNCTION AND AUTOMATIC REFRESHING FUNCTION

CROSS-REFERENCE TO RELATED APPLICATIONS

This application is the U.S. National Phase under 35. U.S.C. §371 of International Application PCT/JP2013/054233, filed Feb. 20, 2013, which claims priority to Japanese Patent Application No. 2012-054333, filed Mar. 12, 2012. The disclosures of the above-described applications are hereby incorporated by reference in their entirety. The International Application was published under PCT Article 21(2) in a language other than English.

TECHNICAL FIELD

The present invention relates to a server apparatus, a login management system, a server program, and a login management program that manage automatic logout of a logged in user.

BACKGROUND ART

As a conventional login management system, a system that performs automatic logout when a logged in user browses a Web page has been known (for example, refer to Patent Document 1).

More specifically, login is performed by user authentication with respect to a server apparatus with an authentication function, and the server apparatus performs logout automatically if no Web page request is made within a predetermined login timeout period.

Meanwhile, a system that performs automatic refreshing upon browse of a Web page has also been known (for example, refer to Patent Document 2). With the automatic refreshing, a Web page is automatically requested to a server apparatus at a predetermined refreshing time interval, to thereby keep latest information displayed on a browser.

The automatic logout function and the automatic refreshing function can enhance security and meet real-time property requirement if employed separately; however, these functions had a problem of being incompatible with each other.

More specifically, if the login timeout period for the automatic logout is set to be longer than the refreshing time interval for the automatic refreshing, a request of the automatic refreshing prevents the login timeout, leading to a security problem.

On the other hand, if the refreshing time interval is set to be longer than the login timeout period, the login timeout takes place before the automatic refreshing, not meeting the real-time property requirement.

Patent Document 1: Japanese Unexamined Patent Application Publication No. 2003-141074

Patent Document 2: Japanese Unexamined Patent Application Publication No. 2005-353025

DISCLOSURE OF THE INVENTION

Problems to be Solved by the Invention

A problem to be solved by the present invention is that the automatic logout function and the automatic refreshing function are incompatible with each other.

Means for Solving the Problems

The present invention is provided with a page responding unit, a login performing unit, a logout performing unit, a counting unit, and a logout managing unit. The page responding unit submits a response of a Web page in response to an automatic request at a predetermined refreshing time interval or a manual request from a user. The login performing unit performs login by user authentication. The logout performing unit performs logout of the user in a case in which the request from the user who logged in is not received within a login timeout period, which is defined to be longer than the refreshing time interval. The counting unit counts the automatic requests received within the login timeout period. The logout managing unit makes the logout performed in a case in which an accumulated refreshing time, which is accumulated due to the successive automatic requests subjected to the counting, exceeds the login timeout period.

PREFERRED MODE FOR CARRYING OUT THE INVENTION

The present invention achieves an objective of realizing compatibility between the automatic logout function and the automatic refreshing function by setting a login timeout period for the automatic logout to be longer than a refreshing time interval for the automatic refreshing, and performing logout based on succession of the automatic requests made at the refreshing time intervals.

More specifically, the present invention makes the logout performed in a case in which an accumulated refreshing time, which is accumulated due to the successive automatic requests, exceeds the login timeout period.

Such login management can be enforced between a general Web server and a client terminal, as well as between an apparatus such as a printer with a Web server function and a client terminal.

An embodiment of the present invention is described hereinafter with reference to the drawings.

Embodiment 1

Configuration of Login Management System

Figure 1:
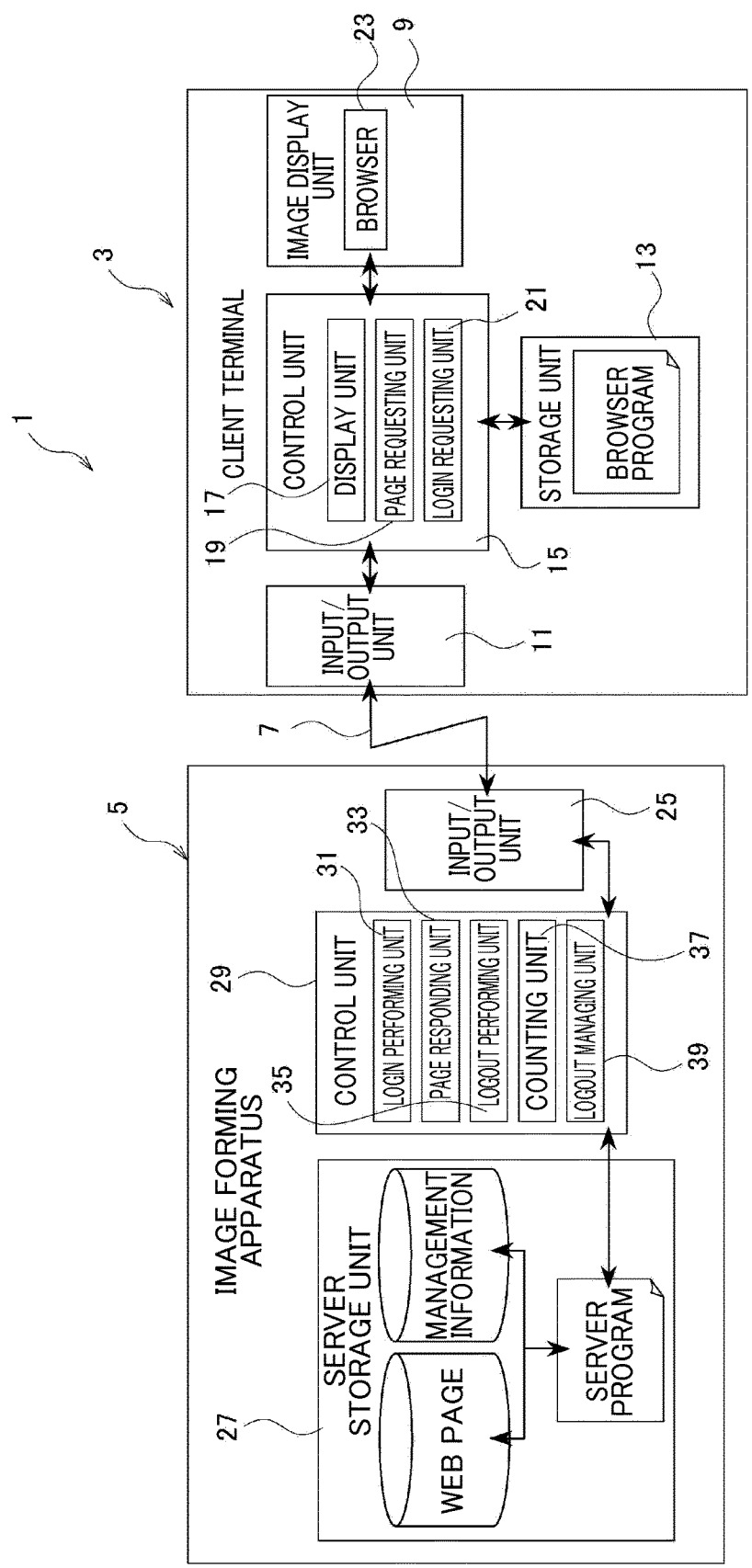
FIG. 1 is a block diagram illustrating a login management system (Embodiment 1)

FIG. 1 is a block diagram illustrating a login management system according to Embodiment 1 of the present invention.

Figure 2:
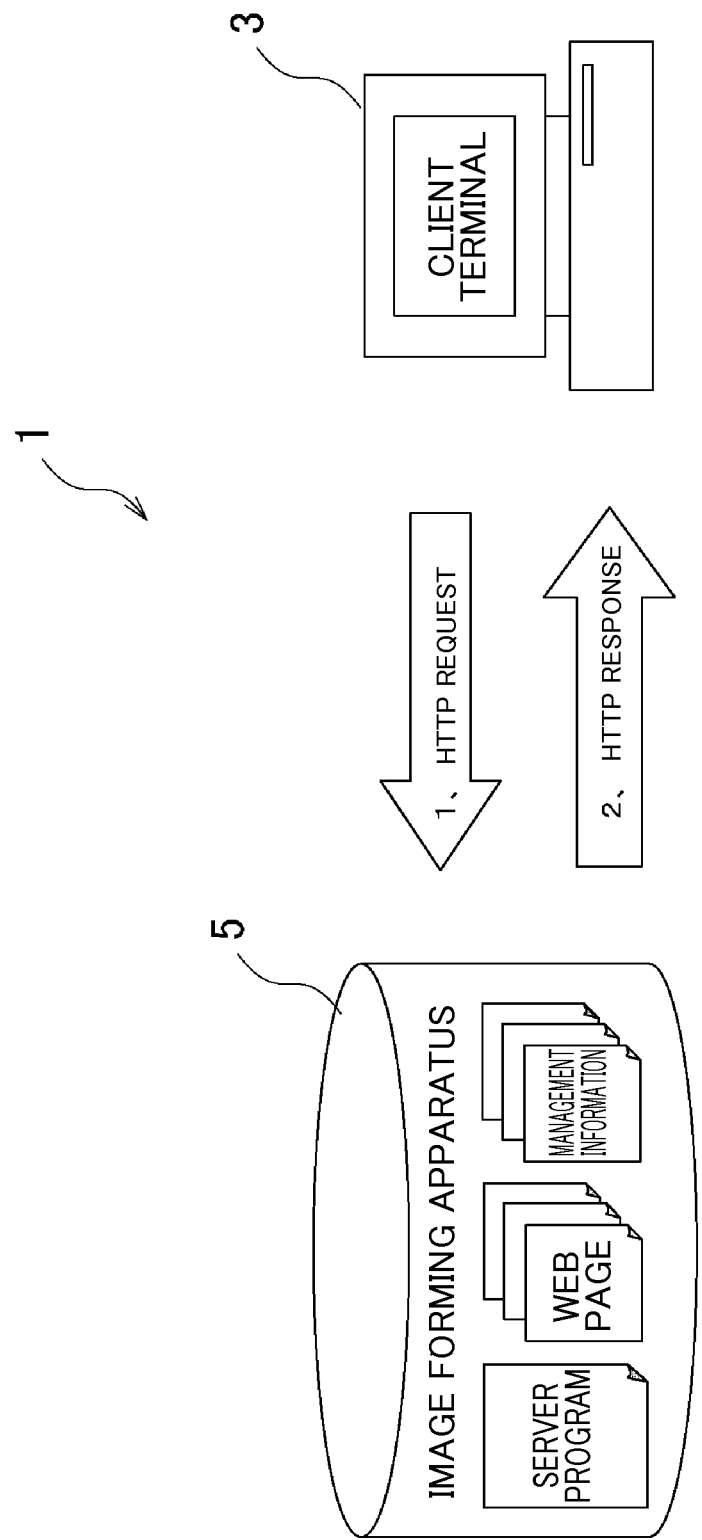
FIG. 2 is a schematic view illustrating a basic concept of a Web page request and a response in the login management system of FIG. 1 (Embodiment 1)

FIG. 2 is a schematic view illustrating a basic concept of a Web page request and a response in the login management system of FIG. 1.

As shown in FIGS. 1 and 2, in a login management system 1, a client terminal 3 and an image forming apparatus 5 as the server apparatus are connected via a network 7 such as a LAN.

In the login management system 1, a Web page generated by the image forming apparatus 5 is displayed on the client terminal 3 by exchange of a request and a response between the client terminal 3 and the image forming apparatus 5.

In the login management system 1 of the present embodiment, upon display of the Web page on the client terminal 3, login management is employed in which the automatic logout of a logged in user and the automatic refreshing of the Web page are realized in parallel.

Client Terminal

As shown in FIG. 1, the client terminal 3 is composed of an information processing device such as a computer. To the client terminal 3, an image display unit 9 composed of a monitor device and external operating devices such as a mouse and a keyboard (not illustrated) are connected. The client terminal 3 is provided with an input/output unit 11, a storage unit 13, and a control unit 15.

The input/output unit 11 is an interface that exchanges data with the image forming apparatus 5. The storage unit 13 is a storage device such as ROM (Read Only Memory), RAM (Random Access Memory), a hard disk, or the like, that stores various control applications and data. The control unit 15 is a control element such as a CPU (Central Process Unit) that executes a software program to perform various control and operations.

The control unit 15 in the present embodiment executes a browser program (client program) in the storage unit 13 to function as a display unit 17, a page requesting unit 19, and a login requesting unit 21.

The display unit 17 realizes the display step, receiving a response from the image forming apparatus 5 and displaying a Web page on the image display unit 9. Display of the Web page is performed by a browser 23 on the image display unit 9.

The page requesting unit 19 realizes the page requesting step, accepting a manual request from a user and an automatic request and submits to the image forming apparatus 5. The manual request is accepted by the browser 23 or by a Web page displayed on the browser 23. Upon acceptance of the manual request, the page requesting unit 19 submits the manual request thus received to the image forming apparatus 5 by using HTTP (HyperText Transfer Protocol).

On the other hand, the automatic request is accepted by a Web page displayed on the browser 23 with the automatic refreshing setting. In a case in which the automatic refreshing is set, the page requesting unit 19 submits the automatic request to the image forming apparatus 5 at predetermined refreshing time intervals. It should be noted that, in the present embodiment, the "automatic request" may be referred to as an "automatic refreshing request".

Upon submission of the automatic refreshing request, identification information such as a variable that can be recognized by the image forming apparatus 5 is added to the automatic refreshing request. As a result, the page requesting unit 19 submits the identification information of the automatic refreshing request along with the automatic refreshing request.

The login requesting unit 21 realizes the login requesting step, accepting authentication information of the user and submits to the image forming apparatus 5. More specifically, an input of authentication information such as a user ID and a password is accepted on a Web page requiring login. The login requesting unit 21 submits the authentication information thus accepted to the image forming apparatus 5 as a login request. This submission is performed by, for example, adding the authentication information to a Web page request.

Image Forming Apparatus

The image forming apparatus 5 is composed of, for example, a printer or a digital multi function peripheral with a Web server function, and provided with an input/output unit 25, a storage unit 27, and a control unit 29 similarly to the client terminal 3.

In other words, the input/output unit 25 is an interface that exchanges data with the client terminal 3. The storage unit 27 is a storage device such as ROM, RAM, a hard disk, or the like, that stores various control applications and data. The control unit 29 is a control element such as a CPU that executes a software program to perform various control and operations.

The control unit 29 of the image forming apparatus 5 in the present embodiment executes a server program in the storage unit 27 to function as a page responding unit 33, a login performing unit 31, a logout performing unit 35, a counting unit 37, and a logout managing unit 39.

The page responding unit 33 realizes the page responding step, submitting a response of a Web page to the client terminal 3 in response to the automatic refreshing request or a manual request from the user.

The Web page is a template file in a format of HTML or the like stored in the storage unit 27. In the Web page, basic information to be submitted to the client terminal 3 is indicated. HTTP is used for submission of the response of the Web page.

The login performing unit 31 realizes the login performing step, performing login by user authentication. The authentication is performed by comparing the authentication information received from the client terminal 3 against management information in the storage unit 27. It should be noted that the management information is user information for authentication and information accompanying the user information.

The logout performing unit 35 realizes the logout performing step, performing the automatic logout. In other words, the logout performing unit 35 performs logout of the user in a case in which the request from the logged in user is not received within the login timeout period. The login timeout period in the present embodiment is defined to be relatively longer than the refreshing time interval of the automatic refreshing.

The counting unit 37 realizes the counting step, counting the automatic requests received within the login timeout period. In this counting, the counting unit 37 counts the number of successive automatic refreshing requests, in other words, the number of successive automatic refreshing.

In the present embodiment, the counting unit 37 counts the identification information added to the automatic refreshing request, and adds "1" to the number of successive automatic refreshing in the management information in the storage unit 27.

In addition, in a case in which the manual request from the user is received, the counting unit 37 resets the number of successive automatic refreshing counted. More specifically, in a case in which the request received includes no identification information, the counting unit 37 changes the number of successive automatic refreshing to "0" in the management information in the storage unit 27.

The logout managing unit 39 realizes the logout managing step, making the logout performed in a case in which an accumulated refreshing time, which is accumulated due to the successive automatic requests counted, exceeds the login timeout period.

More specifically, the accumulated refreshing time is obtained by multiplying the number of successive automatic refreshing that has been counted and stored in the storage unit 27 by the refreshing time interval of the automatic refreshing, and in a case in which the accumulated refreshing time exceeds the login timeout period, the logout managing unit 39 makes the logout performing unit 35 perform logout.

In other words, the logout managing unit 39 makes the logout performed in a case in which the following Equation (1) is fulfilled, X being the refreshing time interval of the automatic refreshing, Y being the login timeout period, and Z being the number of successive automatic refreshing counted.

$$Y \geq X \times Z \qquad \text{Equation (1)}$$

It should be noted that the refreshing time interval of the automatic refreshing can be obtained by obtaining, upon reception of the automatic refreshing request, an elapsed time since the previous request.

Alternatively, the refreshing time interval can be stored in advance in the storage unit 27 of the image forming apparatus 5. Yet alternatively, the number of successive automatic refreshing that fulfills Equation (1) can be stored as a threshold in the storage unit 27. In this case, the logout can be performed in a case in which the number of successive automatic refreshing counted exceeds the threshold.

Login Management

In the login management in the present embodiment, a Web page for management of the image forming apparatus 5 is displayed on the client terminal 3 to a logged in user, while automatically refreshing the Web page and performing the automatic logout of the user.

Figure 3:
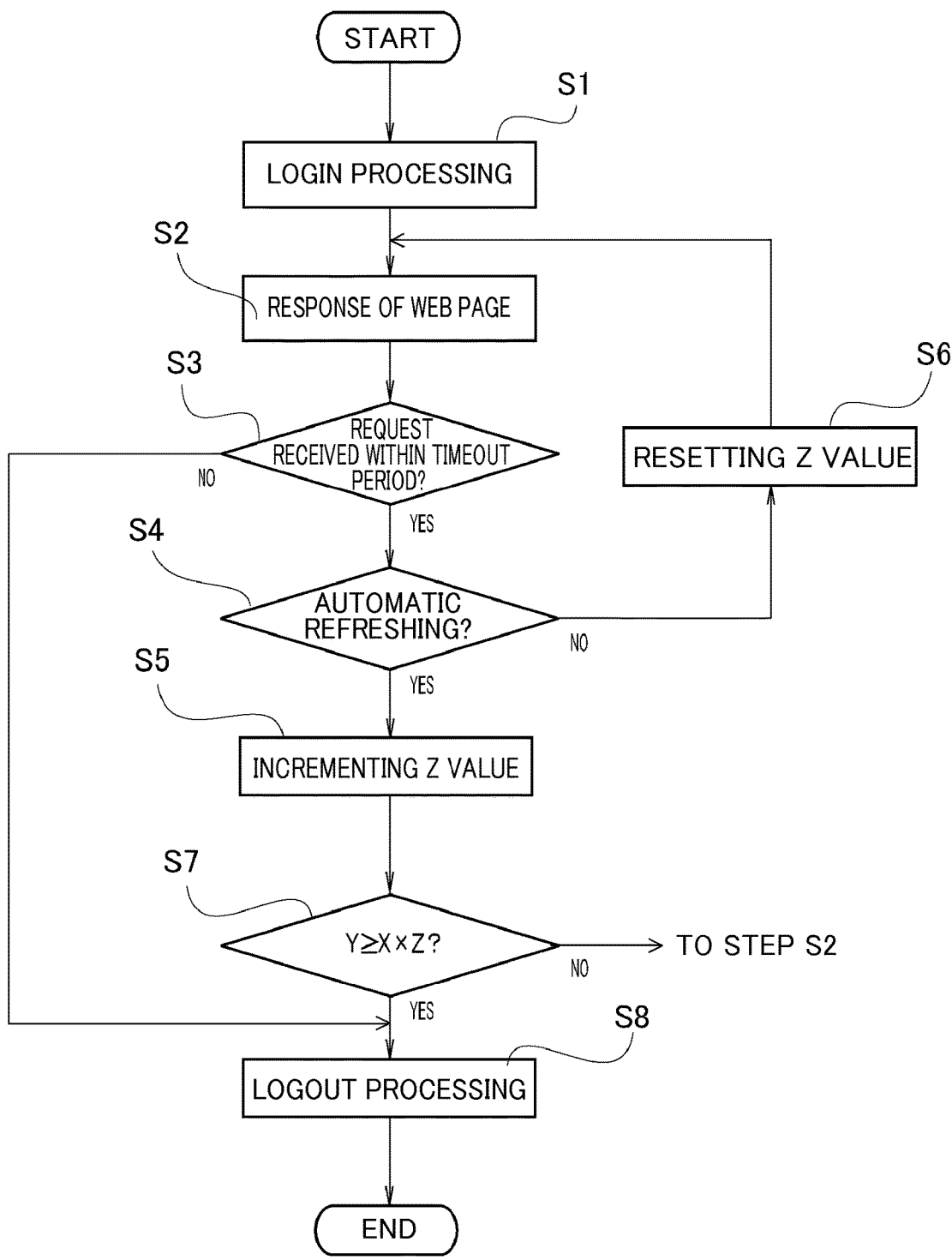
FIG. 3 is a flow chart for login management (Embodiment 1)
Figure 4:
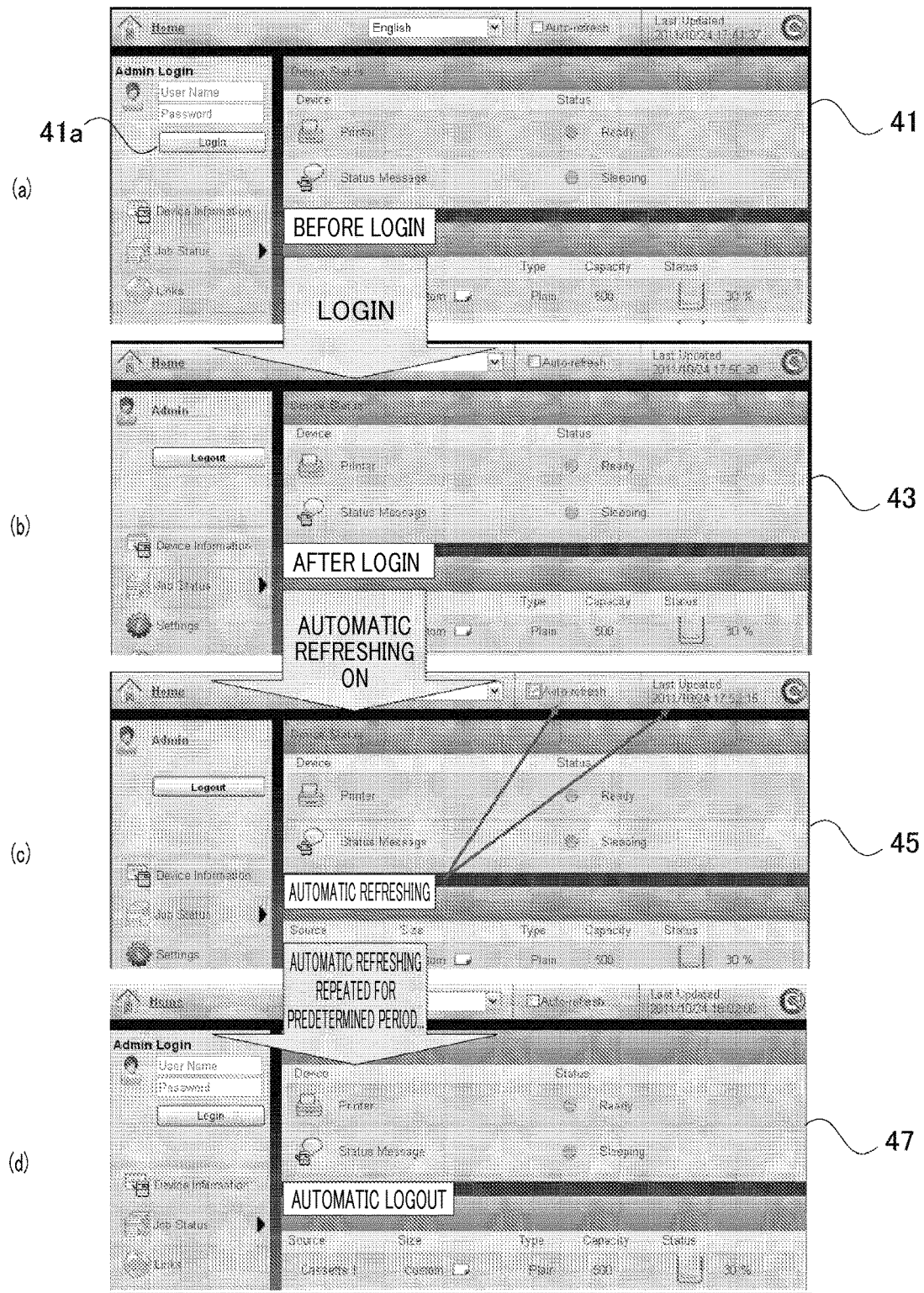
FIG. 4 shows an example of a Web page: (a) a window before login; (b) a window after login; (c) a window upon automatic refreshing; and (d) a window after logout (Embodiment 1).

This login processing is described specifically with reference to FIGS. 3 and 4. FIG. 3 is a flow chart for login management according to Embodiment 1. FIG. 4 shows an example of a Web page according to Embodiment 1: (a) a window before login; (b) a window after login; (c) a window upon automatic refreshing; and (d) a window after logout.

The flowchart of FIG. 3 starts by making a login request in the client terminal 3 in FIG. 1. In other words, the display unit 17 of the client terminal 3 displays a pre-login Web page 41 (a Web page requiring login) of FIG. 4(a) on the browser 23 in the image displaying unit 9. On the Web page 41, an input of authentication information (a user ID and a password), and selection of a login button 41a are accepted.

The authentication information thus input is added to a request of a Web page by the login requesting unit 21, in response to the selection of the login button 41a on the Web page 41. The request is submitted to the image forming apparatus 5 by the page requesting unit 19. The image forming apparatus 5 starts the flowchart of FIG. 3.

In Step S1, the "Login Process" is first performed. In other words, the login performing unit 31 of the image forming apparatus 5 performs authentication of the user based on the authentication information in the request received. Login of the user comes into effect by this authentication, and the processing is advanced to Step S2.

In Step S2, the "response of the Web page" is made. In other words, the page responding unit 33 generates, for the logged-in user, a post-login Web page in response to a request received along with the authentication information, and returns a response to the client terminal 3.

In the client terminal 3, the display unit 17 receives the response and displays the post-login Web page 43 of FIG. 4(b) on the browser 23.

In the present embodiment, the automatic refreshing setting (check for auto-refresh) is further performed as in a Web page 45 in FIG. 4(c). As a result, the page requesting unit 19 makes the automatic request at the refreshing time intervals. Step S2 is thus terminated, and the processing is advanced to Step S3.

In Step S3, processing "Request Received Within Timeout Period?" is performed. In this processing, the page responding unit 33 of the image forming apparatus 5 determines whether the request from the logged in user is received within the login timeout period or not. This determination can be realized by the page responding unit 33 and the counting unit 37.

In a case in which the page responding unit 33 receives the request within the login timeout period (YES), the processing is advanced to Step S4. In a case in which the page responding unit 33 does not receive the request within the login timeout period (NO), the processing is advanced to the logout processing in Step S8. It should be noted that, in the present embodiment, the page responding unit 33 receives at least the automatic refreshing request within the login timeout period, and the processing is advanced to Step S4.

In Step S4, processing "Automatic Refreshing?" is performed. In this processing, the counting unit 37 of the image forming apparatus 5 determines whether the request received is the automatic refreshing request or not. In other words, the counting unit 37 determines presence of the identification information in the request.

In a case in which the identification information is present (YES), the counting unit 37 determines that the request received is the automatic refreshing request and the processing is advanced to Step S5. In a case in which the identification information is not present (NO), the counting unit 37 determines that the request received is the manual request and the processing is advanced to Step S6.

In Step S5, processing "Incrementing Z Value" is performed. In other words, the counting unit 37 adds "1" to the value of Z, the number of successive automatic refreshing, in the management information in the storage unit 27. Step S5 is thus terminated, and the processing is advanced to Step S7.

On the other hand, in Step S6, processing "Resetting Z Value" is performed. In other words, the counting unit 37 changes the value of Z, the number of successive automatic refreshing, to "0" in the management information in the storage unit 27. Step S6 is thus terminated, and the processing is returned to Step S2 and a response of a Web page is made in response to the manual request.

In Step S7, determination of "Y≥X×Z?" is performed. In other words, the logout managing unit 39 determines whether the accumulated refreshing time obtained by multiplying the refreshing time interval X by the number of successive automatic refreshing Z is equal to or greater than the login timeout period Y or not.

In a case in which Y≥X×Z (YES), the processing is advanced to Step S8. In a case in which Y≥X×Z (NO), the processing is returned to Step S2 and a response of the automatic refreshing is made.

In Step S8, "Logout Processing" is performed. In other words, the logout managing unit 39 makes the logout performing unit 35 perform logout of the user in a case in which the automatic refreshing is repeated for a predetermined number of times, or a request is not received within the login timeout period.

In a case in which the automatic refreshing is repeated, the page responding unit 33 generates the post-login Web page in response to the automatic refreshing request, and returns a response to the client terminal 3.

In the client terminal 3, the display unit 17 receives the response and displays the post-login Web page 47 of FIG. 4(*d*) on the browser 23.

As described above, in the login management of the present embodiment, the automatic refreshing request is made within the login timeout period, thereby preventing the login timeout from occurring and infallibly performing the automatic refreshing. Therefore, the invention can meet the requirement of real-time property by displaying latest information by the automatic refreshing.

On the other hand, in a case in which the automatic refreshing is repeated successively, automatic logout can be performed when the accumulated refreshing time obtained from the number of successive automatic refreshing is equal to or greater than the login timeout period. Therefore, enhanced security is also realized by the automatic logout.

Effect of Embodiment 1

The image forming apparatus 5 as the server apparatus of the present embodiment is provided with the page responding unit 33, the login performing unit 31, the logout performing unit 35, the counting unit 37, and the logout managing unit 39. The page responding unit 33 submits a response of a Web page in response to an automatic request at a predetermined refreshing time interval or a manual request from a user. The login performing unit 31 performs login by user authentication. The logout performing unit 35 performs logout of the user in a case in which the request from the user who logged in is not received within the login timeout period, which is defined to be longer than the refreshing time interval. The counting unit 37 counts the automatic request upon reception of the automatic request within the login timeout period. The logout managing unit 39 makes the logout performing unit 35 perform logout in a case in which the accumulated refreshing time, which is accumulated due to the successive automatic requests counted, exceeds the login timeout period.

Therefore, in the present embodiment, by setting the refreshing time interval of the automatic refreshing longer than the login timeout period, the automatic refreshing request can be made within the login timeout period. As a result, the present embodiment can prevent the login timeout from occurring and infallibly perform the automatic refreshing.

Even in such a configuration, in the present embodiment, in a case in which the automatic refreshing is repeated successively, automatic logout can be performed when the accumulated refreshing time obtained from the number of successive automatic refreshing is equal to or greater than the login timeout period. Failure of login timeout to occur due to repeated automatic refreshing can thus be prevented.

As a result, in the present embodiment, the automatic logout function and the automatic refreshing function can be provided in parallel and can enhance security and meet real-time property requirement.

In addition, in the present embodiment, the count of the automatic request is reset in a case in which the counting unit 37 receives the manual request from the user who logged in.

Therefore, in the present embodiment, repetition of the automatic request can be determined infallibly, and logout based on this can be performed infallibly. Therefore, in the present embodiment, enhanced security can be realized more infallibly.

In addition, in the present embodiment, since the logout managing unit 39 obtains the accumulated refreshing time by multiplying the refreshing time by the number of the successive automatic requests obtained by the counting, logout based on repetition of the automatic refreshing can be performed easily and infallibly.

The login managing system 1 of the present embodiment includes the client terminal 3 connected to the image forming apparatus 5. The client terminal 3 includes the login requesting unit 21, the page requesting unit 19, and the display unit 17. The login requesting unit 21 accepts the authentication information of the user and submits to the image forming apparatus 5. The page requesting unit 19 accepts the manual request and the automatic request and submits to the image forming apparatus 5. The display unit 17 receives a response from the image forming apparatus 5 and makes the Web page displayed.

Therefore, in the login management system 1, the automatic logout function and the automatic refreshing function can be realized in parallel upon display of a Web page based on the exchange of a request and a response between the client terminal 3 and the image forming apparatus 5.

In addition, the server program to be executed by a computer can be stored (recorded) non-transitory in a computer-readable storage medium, such as ROM and a hard disk in the computer, an external storage device, or a portable storage medium.

The external storage device indicates a memory expansion device incorporating a storage medium such as a CD-ROM (Compact Disk-Read only Memory), that is externally connected to an electronic device. The portable storage medium indicates a storage medium that can be loaded into a storage medium driving device (drive device) and is portable, such as a flexible disk, a memory card, and a magneto optical disk.

And then, the program stored in the storage medium is loaded onto RAM and the like of the computer and executed by a CPU (control unit). This execution realizes a function of the computer.

What is claimed is:

1. A server apparatus comprising:
a processor; and
a memory communicably connected to the processor in which a computer program is stored,
wherein the processor executes the computer program, such that the processor operates to:
submit a response of a Web page in response to an automatic request at a predetermined refreshing time interval or a manual request from a user;
perform login by authentication of the user;
perform logout of the user in a case in which the manual request from the user who logged in is not received within a login timeout period, which is defined to be longer than the refreshing time interval;
perform counting of the automatic request upon reception of the automatic request within the login timeout period;
make the logout be performed in a case in which an accumulated refreshing time, which is accumulated due to the successive automatic requests subjected to the counting, exceeds the login timeout period; and reset the count of the automatic request in a case in which the manual request from the user who logged in is received, wherein the accumulated refreshing time is calculated by multiplying the refreshing time by the number of the successive automatic requests obtained by the counting.

2. A login management system comprising:

a server apparatus; and a client terminal that is connected to the server apparatus, wherein the server apparatus comprises:

a first processor; and a first memory communicably connected to the first processor in which a computer program is stored, wherein the first processor executes the computer program, such that the first processor operates to:

submit a response of a Web page in response to an automatic request at a predetermined refreshing time interval or a manual request from a user;

perform login by authentication of the user;

perform logout of the user in a case in which the manual request from the user who logged in is not received within a login timeout period, which is defined to be longer than the refreshing time interval;

perform counting of the automatic request upon reception of the automatic request within the login timeout period;

make the logout performed in a case in which an accumulated refreshing time, which is accumulated due to the successive automatic requests subjected to the counting, exceeds the login timeout period; and reset the count of the automatic request in a case in which the manual request from the user who logged in is received, and wherein the client terminal includes:

a second processor; and a second memory communicably connected to the second processor in which a computer program is stored, wherein the second processor executes the computer program, such that the second processor operates to:

accept authentication information of the user and submit to the server apparatus; and accept the manual request and the automatic request and submit to the server apparatus; and receive a response from the server apparatus and make the Web page displayed, wherein the accumulated refreshing time is calculated by multiplying the refreshing time by the number of the successive automatic requests obtained by the counting.

3. A computer-readable non-transitory storage medium that stores a server program, the server program comprising:

a page responding step of submitting a response of a Web page to a computer in response to an automatic request at a predetermined refreshing time interval or a manual request from a user;

a login performing step of performing login by user authentication;

a logout performing step of performing logout of the user in a case in which the manual request from the user who logged in is not received within a login timeout period, which is defined to be longer than the refreshing time interval;

a counting step of performing counting of the automatic request upon reception of the automatic request within the login timeout period; and a logout managing step of making the logout performed in a case in which an accumulated refreshing time, which is accumulated due to the successive automatic requests subjected to the counting, exceeds the login timeout period, wherein counting of the automatic request is reset in the counting step in a case in which the manual request from the user who logged in is received, and wherein the accumulated refreshing time is calculated by multiplying the refreshing time by the number of the successive automatic requests obtained by the counting.

* * * * *

UNITED STATES PATENT AND TRADEMARK OFFICE
CERTIFICATE OF CORRECTION

PATENT NO.        : 9,727,713 B2                                Page 1 of 1
APPLICATION NO.   : 14/384375
DATED             : August 8, 2017
INVENTOR(S)       : Ryohei Agawa It is certified that error appears in the above-identified patent and that said Letters Patent is hereby corrected as shown below:

In the Specification

Column 6 Line 62, Change "$Y \geq X \times Z$" to --$Y < X \times Z$--.

Signed and Sealed this
Sixth Day of March, 2018

Andrei Iancu
*Director of the United States Patent and Trademark Office*